United States Patent
Kragle

(10) Patent No.: US 6,317,960 B1
(45) Date of Patent: Nov. 20, 2001

(54) EXTRUSION DIE AND METHOD OF FORMING

(75) Inventor: Harry A. Kragle, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/473,940

(22) Filed: Dec. 28, 1999

(51) Int. Cl.[7] ................................................ B23P 13/04
(52) U.S. Cl. .............................. 29/558; 29/423; 29/557; 29/896.6
(58) Field of Search ............................ 29/418, 428, 557, 29/558, 896.6, 423; 425/461; 264/177.12

(56) References Cited

U.S. PATENT DOCUMENTS

| | | | |
|---|---|---|---|
| 3,790,654 | 2/1974 | Bagley | 264/177 |
| 3,846,197 * | 11/1974 | Wiley | 216/33 |
| 3,905,743 | 9/1975 | Bagley | 425/464 |
| 4,041,597 * | 8/1977 | Folmar et al. | 29/423 |
| 4,354,820 * | 10/1982 | Yamamoto et al. | 425/461 |
| 4,640,454 * | 2/1987 | Yamamoto et al. | 228/161 |
| 4,743,191 * | 5/1988 | Chao | 425/190 |
| 4,820,146 * | 4/1989 | Inoue et al. | 425/461 |
| 4,884,960 * | 12/1989 | Chao | 425/97 |
| 5,066,215 * | 11/1991 | Peters et al. | 425/464 |
| 5,238,386 * | 8/1993 | Cunningham et al. | 425/192 R |
| 5,308,568 * | 5/1994 | Lipp | 264/177.12 |
| 5,714,228 | 2/1998 | Beckmeyer et al. | 428/118 |
| 5,731,562 | 3/1998 | Beckmeyer et al. | 219/69.2 |
| 5,761,787 | 6/1998 | Kragle et al. | 29/418 |
| 5,807,590 * | 9/1998 | Ishikawa et al. | 425/190 |
| 5,964,020 * | 10/1999 | Kragle et al. | 29/423 |
| 6,206,675 * | 3/2001 | BeVier | 425/190 |

FOREIGN PATENT DOCUMENTS

| | | | |
|---|---|---|---|
| 63-28520 | 2/1988 | (JP) | B23H/7/22 |
| 63-28522 | 2/1988 | (JP) | B23H/9/00 |
| 63-28523 | 2/1988 | (JP) | B23H/9/00 |

\* cited by examiner

Primary Examiner—S. Thomas Hughes
Assistant Examiner—Essama Omgba
(74) Attorney, Agent, or Firm—Kees van der Sterre

(57) ABSTRACT

A method for forming an extrusion die for producing honeycomb structures having hexagonal shaped cells is disclosed. A plurality of at least three plates are straight cut across the surface portion of each plate with desired angles to produce hexagonal shaped pins. The pins from each of the three plates are successively bonded to a die body or laminated carrier plate, with such orientation and positioning as to produce a die face with hexagonally shaped discharge slots.

9 Claims, 4 Drawing Sheets

Direction of third cuts

Direction of first cuts

Direction of second cuts

Direction of third cuts

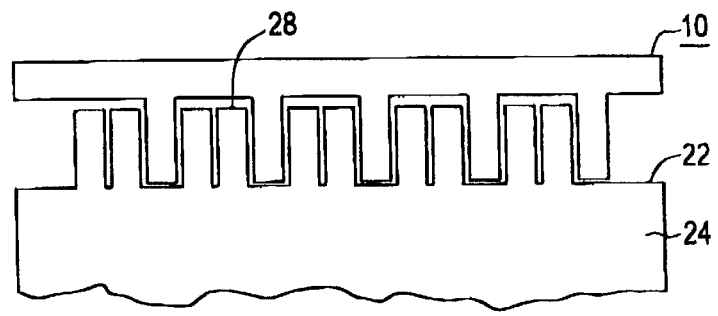
FIG. 7
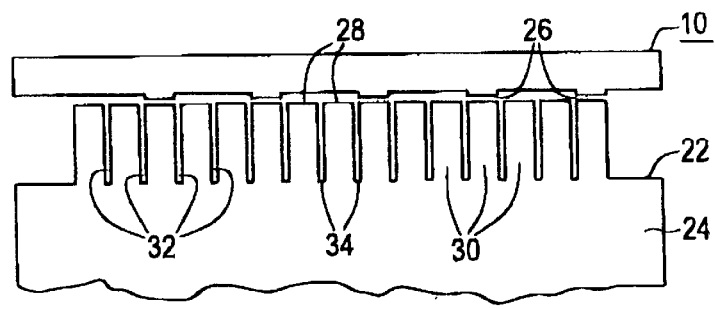
FIG. 7A
FIG. 8
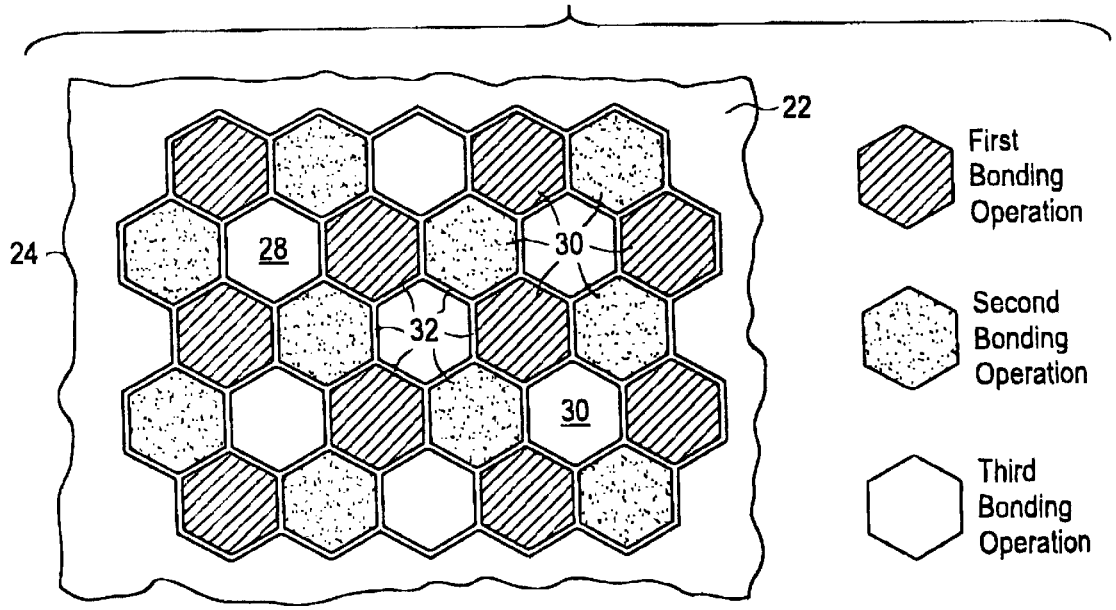

EXTRUSION DIE AND METHOD OF FORMING

BACKGROUND OF THE INVENTION

The present invention relates to dies for extruding honeycomb structures from plasticized organic or inorganic batch materials. More particularly, the invention relates to the discharge face portion of an extrusion die for extruding hexagonal shaped honeycomb structures or cells, and method for producing the such face.

The use of extrusion dies to form thin-walled honeycomb structures is well known in the art. U.S. Pat. Nos. 3,790,654 and 3,905,743 to Bagley describe one design for such a die, with such design incorporating a plurality of feed holes entering an inlet face of a die body, and extending through such body of the die to convey extrudable material to a discharge face section. The outlet face or faceplate area has an array of discharge slots formed about a plurality of pins. The discharge slots, formed between a plurality of such pins interconnect with each other, reforming the extrudable material into an interconnected wall structure for a channeled body as the material is discharged from the outlet face of the die.

The shape of the pins formed in the outlet face of the die determine the shape of the cells formed in the extruded honeycomb structure. The design principles for square, triangular and even hexagonal celled dies are remarkably similar, particularly with regard to the establishment of values for slot depth, hole/slot overlap, feed hole diameter, feeding patterns, knitting zones and other parameters. Moreover, body plates which provide the feed holes for the various cell shapes are essentially alike whether they are of laminated or monolithic construction.

However, the manufacture of an outlet or discharge face portion with hexagonal pins is the most challenging of the three cell designs, because hexagonal slots, formed between the hexagonal pins, do not extend continuously and linearly across the full face of the die. Slots for square and triangular cells are readily formed by tools such as milling saws, abrasive blades and wire-EDM processes, which cut in long straight lines.

Hexagonal faceplates or discharge portions, on the other hand, have slots composed of short segments which join together in a zig-zag fashion and never form a long, straight line across the face of the die. Such non-linear paths do not accommodate tool runout of saws or blades, nor are they compatible with the straight stretched wire configuration of the wire-EDM process. Thus, the present invention is not concerned with the manufacturer of the feed hole portion of extrusion dies, but rather sets forth an improved method for producing a faceplate or discharge face portion for a die capable of extruding hexagonal shaped cells in a honeycomb structure In the past, hexagonal-celled dies were formed by rather complex and involved time consuming methods such as shown in U.S. Pat. Nos. 5,714,228 and 5,731,562 as well as Japanese Patent Application Disclosure Nos. 63-28523, 63-28522, and 63-28520. The U.S. Patents relate to the creation of a single plunge full-pattern EDM electrode for producing a cellular die. Initially, a plurality of spaced-apart holes are cut through an electrode block, and an electrode wire is positioned through each hole in the block and the wire performs electrical discharge machining to form a cutting surface with a plurality of hexagonal shaped cell walls, and the electrode is then used to EDM cut the faceplate area of an extrusion die.

The Japanese patent application disclosures relate to the manufacture of a honeycomb extrusion die having hexagonal shaped slots for forming an extrusion having hexagonal shaped cells. The die is formed by a plurality of blades which, on their first EDM pass, form opposed slots of a hexagonal configuration. The blades are then rotated 60° and EDM form a second pair of opposed slots of the hexagonal configuration, and finally the blades are again rotated another 60° and produce the final opposed slots of the hexagonal configuration. The methods disclosed in the forgoing U.S. patents and the Japanese application disclosures are cumbersome, expensive and time-consuming.

In light of the known manufacturing difficulties, it is a principal object of the present invention to provide an improved method of producing an extrusion die for extruding honeycomb structures with hexagonal cells.

It is a further object of the invention to provide a method of forming hexagonal shaped pins in the discharge face or faceplate portion of an extrusion die.

Other objects and advantages of the invention will be apparent from the following description thereof.

SUMMARY OF THE INVENTION

In accordance with the present invention, the complexity of the known methods for producing dies capable of forming hexagonal shaped honeycomb structures has been overcome. That is, in the past it was thought that hexagonal patterns do not lend themselves to straight-through cuts for forming hexagonal shaped slots. However, I have found that straight-through cuts can actually form hexagonal pins, such as by forming an initial straight-through cut and then subsequently forming two additional straight-through cuts, one at 60° and the other at 120° to the initial cut to form the hexagonal pins as shown in the drawings. The machining of the cuts may be accomplished by saws, blades, grinding or wire-EDM processes.

Three initial pin plates may be produced in the manner described above, with each one containing exactly one-third the number of pins required for the final die. In subsequent operations, the pins from each of these three plates are bonded to a common body blank or other supporting faceplate as desired. Thus, a substantially simplified method of producing a die for forming hexagonal celled honeycomb structures is set forth.

DESCRIPTION OF THE DRAWINGS

In the appended drawings, like reference characters designate like or corresponding parts in the various figures, although none of the figures are intended to indicate a scale or relative proportions of the elements shown therein.

FIGS. 7 and 7A are similar to FIGS. 6 and 6A, but showing the final bonding of pins to the body or faceplate.

FIG. 8 is an enlarged fragmental schematic plan view of the final die body or carrier plate illustrating the sequence of bonding the pins from the initial plates to form the pins for the final die discharge outlet face.

DETAILED DESCRIPTION OF THE INVENTION

Figure 1:
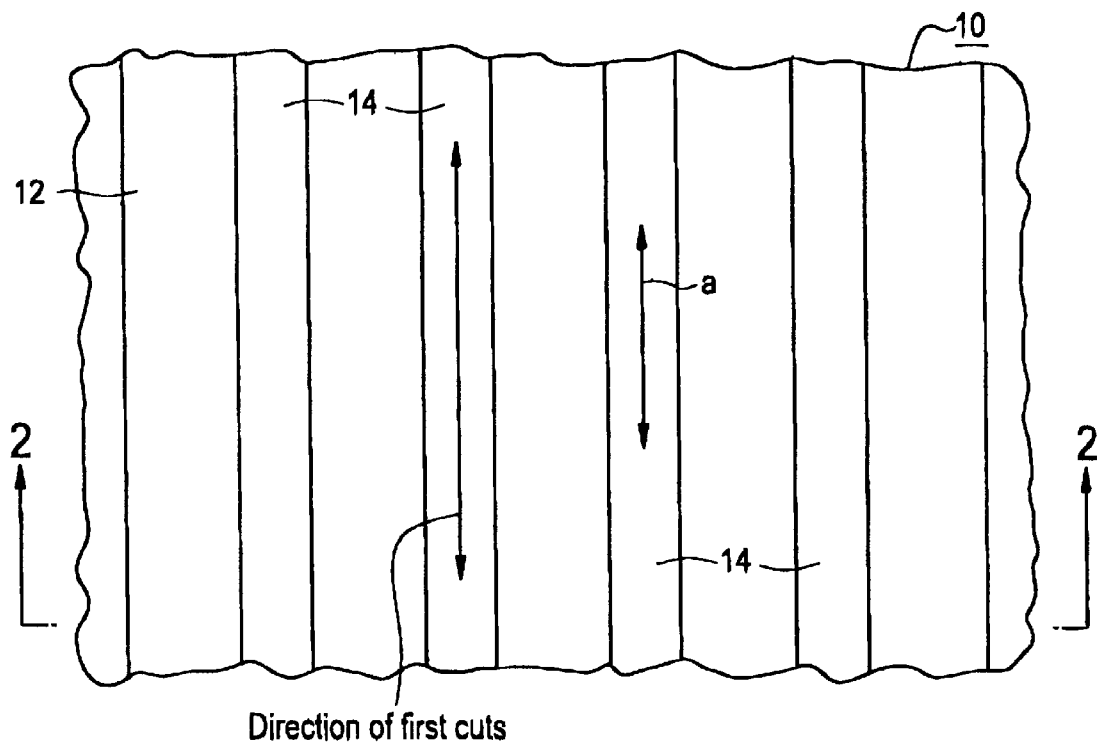
FIG. 1 is an enlarged fragmental schematic plan view illustrating the first straight-through cut for forming hexagonal pins in a preliminary pin plate.
Figure 2:
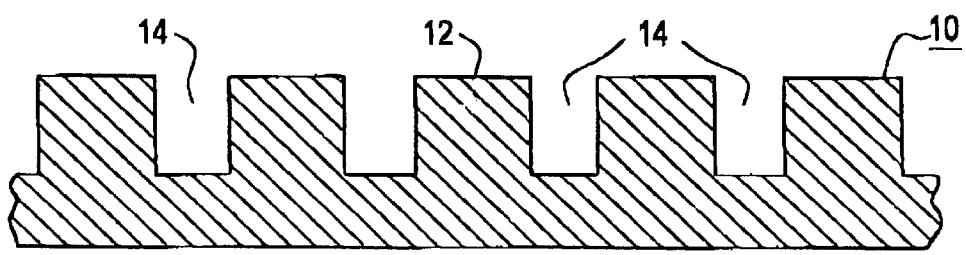
FIG. 2 is a cross-sectional view taken along line 2—2 of FIG. 1.
Figure 3:
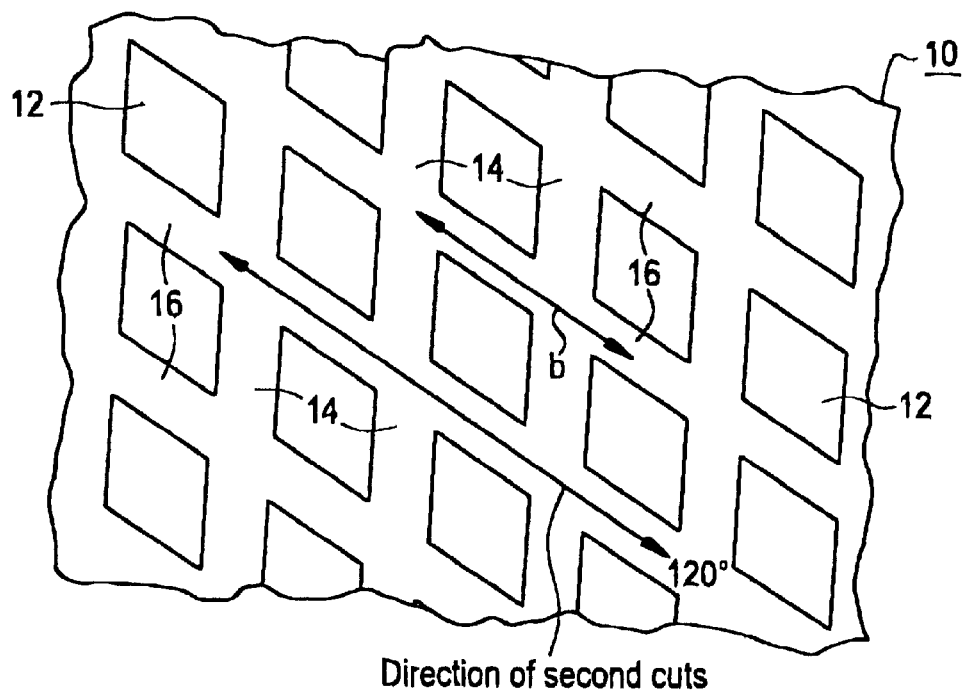
FIG. 3 is similar to FIG. 1, but showing an additional straight-through cut.
Figure 4:
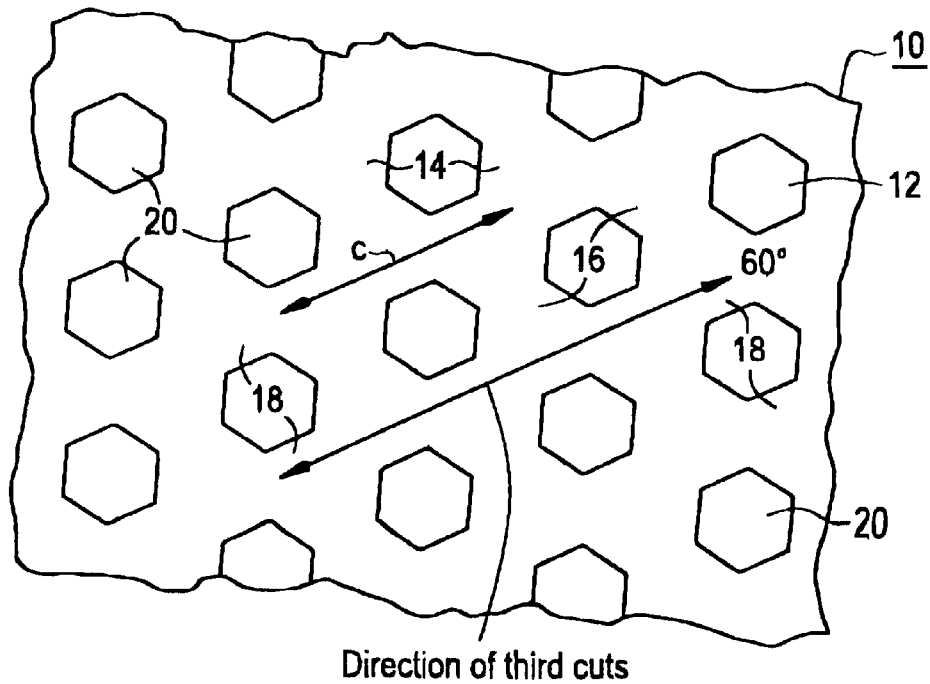
FIG. 4 is similar to FIG. 3., but showing a final straight-through cut to form a plurality of hexagonal shaped pins.

Referring now to the drawings, and particularly FIGS. 1–4, a simplified method of forming hexagonal pins on an initial pin plate 10 is shown. A plurality of initial cuts are formed along a first direction, shown by arrow a, in the face 12 of the initial pin plate 10 to form a plurality of parallel grooves 14. As shown in FIGS. 3 and 4, two additional straight-through cuts are made in the surface 12 of the initial pin plate 10 at 60° and 120° from the initial cut, to form a plurality of spaced apart hexagonal pins 20.

It is immaterial which of the second or third cuts are at the 60° or 120° angle with respect to the first cut. However, for purposes of illustration, FIG. 3 illustrates the second cut as being along arrow b which is at an angle of 120° with respect to the cut of arrow a, thereby producing a plurality of parallel grooves 16 in the face 12 of the initial pin plate 10.

FIG. 4 illustrates the final straight-through cut as being along arrow c which is 60° with respect to the cut of arrow a, forming a plurality of parallel grooves 18, and finally the plurality of spaced apart hexagonal pins 20. Three such initial pin plates 10 are formed in the same manner, with it being understood that the grooves 14, 16 and 18 of each plate are formed with a desired width to accommodate the positioning of the pins of the other two plates therewithin and with the desired slot width between the assembled pins.

FIGS. 5 through 7A illustrate the bonding of the three initial pin plates to a billet die, or a carrier plate as utilized in the practice of a laminated die. The schematic drawings are set forth only to illustrate the method of bonding and are not an accurate depiction of the hexagonal pins as they would appear in a more graphic illustration.

Figure 5:
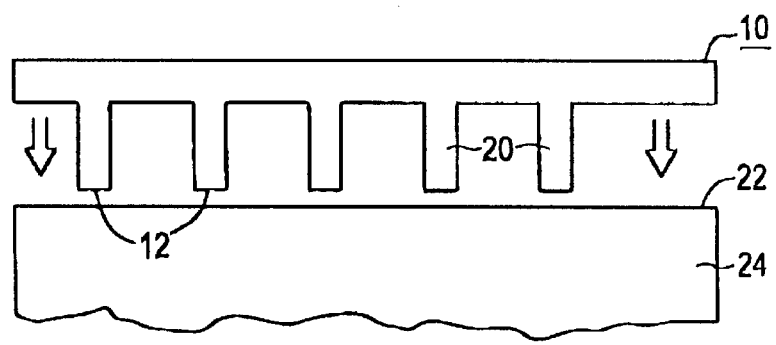
FIGS. 5 and 5A are enlarged fragmental elevational schematic views illustrating the bonding of the first plate of hexagonal pins to a body plate or faceplate.
Figure 5A:
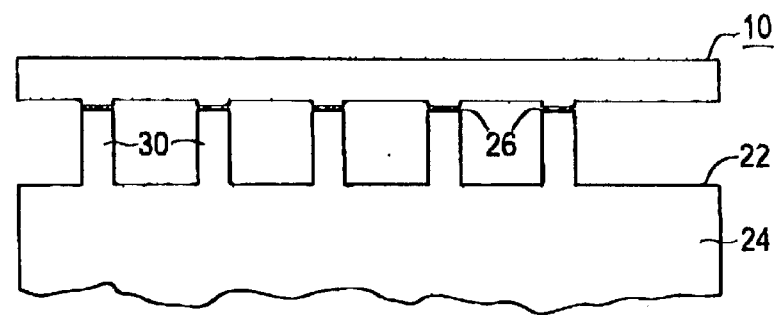

FIG. 5 shows the positioning of a first initial pin plate 10 with the surface 12 of the hexagonal pins 20 being positioned adjacent a surface 22 of a billet die or carrier plate 24, as desired. FIG. 5A illustrates the pins 20 of the first initial pin plate 10 being fused to the billet die or carrier plate 24 to form the first set of hexagonal pins 30 thereon. Also, FIG. 5A illustrates the fact that after the pins 20 have been fused to the die or plate 24 to form new pins 30 thereon, initial pin plate 10 is cut away from the pins 30 at 26 by any suitable means such as saw cutting or wire EDM to form the discharge surface 28 (FIGS. 7A and 8) of the die.

Figure 6:
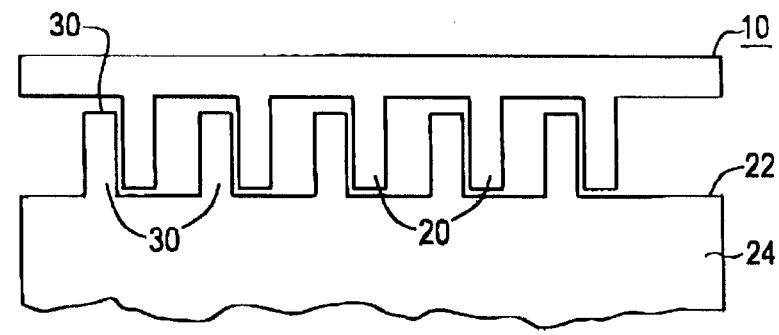
FIGS. 6 and 6A are similar to FIGS. 5 and 5A, but illustrating the bonding of the pins from a second pin plate to the body or faceplate.
Figure 6A:
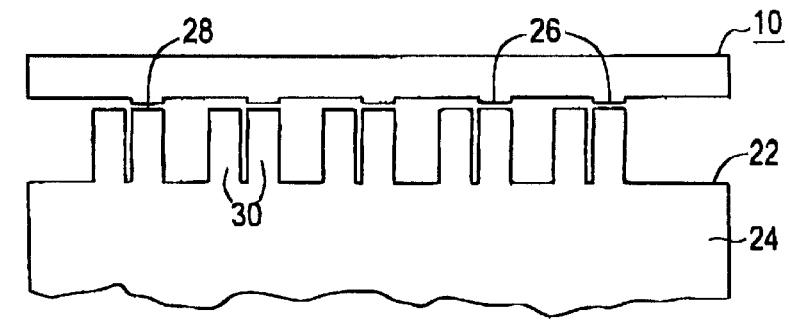

FIGS. 6 and 6A are similar are to FIGS. 5 and 5A except that they illustrate the bonding of the pins 20 from the second initial pin plate 10 to the die or plate 24 to form the second set of pins 30 thereon. Finally, FIGS. 7 and 7A illustrate the bonding of the pins 20 from the third initial pin plate 10 to the die or plate 24 to thereby bond the final set of hexagonal pins 30 thereto, and thus produce the desired hexagonal discharge pin face with desired width hexagonal shaped slots 32 formed therebetween.

FIG. 8 is a plan view of the outlet or discharge face of the finished die or carrier plate 24 illustrating the sequence of the bonding operation. Machinable materials of high yield strength, such as high strength tool steels or stainless steel alloys constitute the preferred fabrication materials for the pin plates 10 and the billet die or carrier plate 24. The alignment between the pin plates and the die or carrier plate 24 is very important, since any mismatch will show up as a comparable variation in the final slot width 32. One preferred method of alignment is the utilization of precision dowels and holes as is known in the prior art.

U.S. Pat. No. 3,678,570 to Plaulonis et al. describes one suitable type of a diffusion bonding procedure which can be utilized with the present invention, since it is particularly useful for superalloy and stainless steel bonding, wherein the alloy interlayers are used to assist the diffusion bonding process through the formation of a transient liquid phase. Also, these interlayers promote good diffusion bonding of similar materials at temperatures and pressures somewhat lower than required for conventional diffusion processes, which also may be utilized.

With respect to the sequence of bonding operations as shown in FIG. 8, it is apparent that although the second and third pin plates are identical to the first one, a different alignment location is required for each successive pin plate 10, to insure that the pins 20 are positioned in the correct location on the receiving plate 24 with the desired hexagonal slots 32 positioned between the hexagonal pins 30. It is apparent that at least three initial pin plates 10 are required to provide the pins 30 on a single die or faceplate 24. The use of a minimum number of pin plates 10 is desirable, since each additional bonding operation exposes the assembly process to more opportunities for misalignment in bonding. Thus, although more than three initial pin plates 10 may be utilized to produce the final die or carrier plate 24, it is preferred to utilize only three initial pin plates as described hereinbefore.

When it is desired to bond the pins 20 directly to a surface 22 of a billet die 24, it is understood that appropriate feed holes will be formed in an inlet face of the billet die to communicate with root portions 34 of the hexagonal discharge slots 32. Also, when the ends 20 of the initial pin plates 10 are bonded to a carrier plate such as utilized in the practice for forming laminated dies, two alternatives are possible. One is to bond the carrier plate to a body plate and transition feed holes from the body portion to the root portions 34 of the hexagonal slots 32. Another would be to position the surface 28 against an outlet face of a die body portion with the discharge slots 32 in alignment with feed holes formed through the die body, and the pins 30 then fused to the die body with the pins being removed along surface 22 from the carrier 24, in a manner similar to the procedure shown in U.S. Pat. No. 5,761,787.

Although for purposes of illustration I have disclosed certain specific embodiments of my invention, it will become apparent to those skilled in the art that various changes and modifications may be made thereto without departing from the spirit and scope of the invention as defined in the appended claims.

I claim:

1. A method of forming a discharge face portion of an extrusion die which comprises: forming a plurality of spaced-apart hexagonal-shaped pins on at least three initial members by cutting sets of parallel grooves across a surface portion of each initial member, such that each set intersects another set at an angle of 60 degrees, and sequentially bonding the hexagonal-shaped pins from each of said initial members to a master member to form hexagonal discharge slots, therebetween.

2. A method of forming a discharge face portion of an extrusion die as defined in claim 1 including the steps of bonding the spaced-apart hexagonal-shaped pins of a first initial member to a surface of the master member, and removing the first initial member from the bonded pins.

3. A method of forming a discharge face portion of an extrusion die as defined in claim 2 including the steps of positioning the spaced-apart hexagonal-shaped pins of a second initial member adjacent to, but spaced-apart a desired discharge slot distance from, the bonded pins of said first initial member, bonding such positioned pins to the surface of the master member, and removing the second initial member from the bonded pins.

4. A method of forming a discharge face portion of an extrusion die as defined in claim 3 including the steps of positioning the spaced-apart hexagonal-shaped pins of a third initial member adjacent to, but spaced-apart a desired discharge slot distance from the bonded pins of said first and second initial members, bonding such positioned pins to the surface of the master member, and removing the third initial member from the bonded pins.

5. A method of forming a discharge face portion of an extrusion die as defined in claim 1 including the step of cutting the plurality of grooves in each initial member with a width sufficient to receive the pins from the other initial members therein with a desired slot space therebetween.

6. A method of making a die for extruding honeycomb structures with hexagonal cells which comprises: forming a plurality of spaced-apart hexagonal pins on a plurality of support means by cross-cutting each support means with sets of parallel grooves across a surface portion of the support means such that each set intersects another set at an angle of 60 degrees to form the hexagonal pins therebetween, bonding the pins of an individual support means to a die member surface and removing the support member from the bonded pins, positioning and bonding the pins from the plurality of support means to the die member surface in the same manner as the individual support means until hexagonal slots are formed on the die member surface between the bonded hexagonal pins, and providing feed holes in the die member to communicate with the hexagonal slots.

7. A method of making a die for extruding honeycomb structures with hexagonal cells as defined in claim 6 including the steps of providing a die body having the die member surface, and forming feed holes in the die body which communicate with the hexagonal slots.

8. A method of making a die for extruding honeycomb structures with hexagonal cells as defined in claim 6 including the steps of providing a carrier plate having the die member surface, incorporating the carrier plate in a laminated die and providing feed holes to the hexagonal slots formed between the hexagonal pins.

9. A method of forming a discharge face portion of an extrusion die which comprises: forming a plurality of spaced-apart hexagonal-shaped pins on at least three initial members by cutting a plurality of parallel grooves in a given direction across a surface portion of each initial member to form two sides of the hexagonal pins, thereafter cutting a second set of parallel grooves at an angle of 60 degrees with respect to the initial given direction across a surface portion of each member to form two additional sides of the hexagonal pins, thereafter cutting a third set of parallel grooves at an angle of 120 degrees with respect to the initial given direction across a surface portion of each member to form the final two sides of the hexagonal pins, and sequentially bonding the hexagonal-shaped pins from each of said initial members to a master member to form hexagonal discharge slots therebetween.

\* \* \* \* \*